Aug. 5, 1924.
W. H. WINEMAN
APPARATUS FOR MAKING DRILL STEELS
Filed Feb. 10, 1917     2 Sheets-Sheet 1
1,503,678
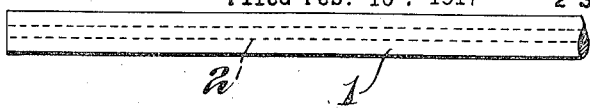
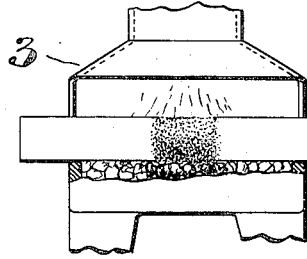
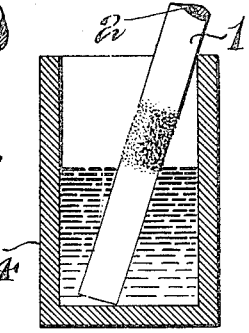
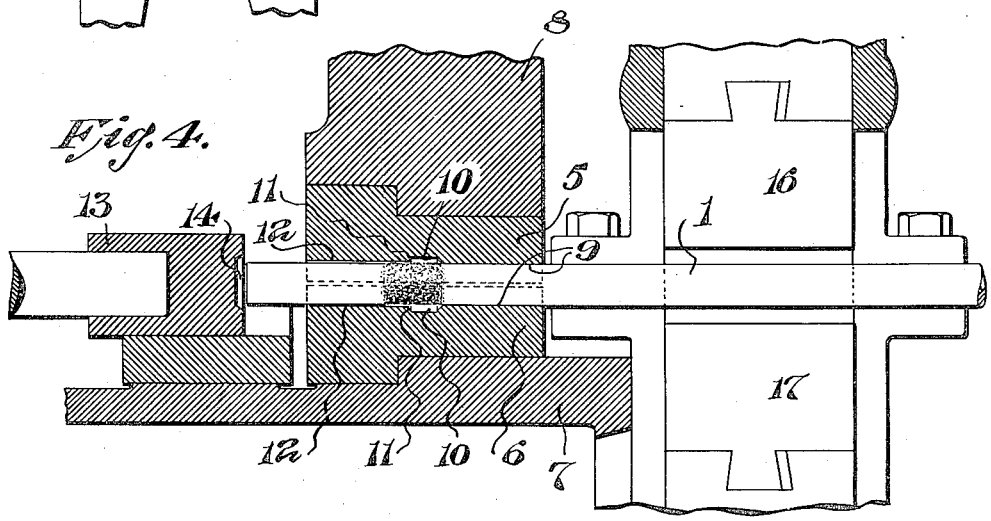
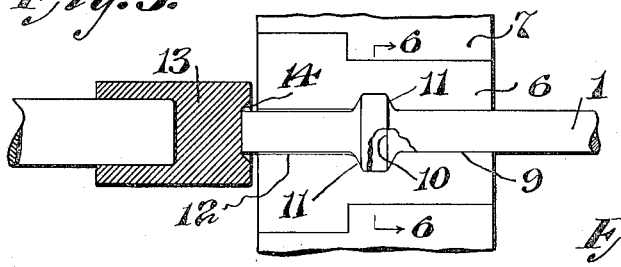
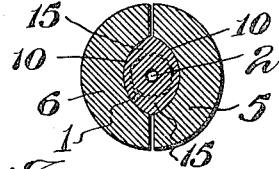
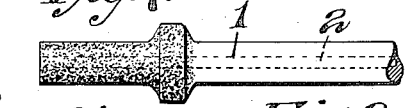
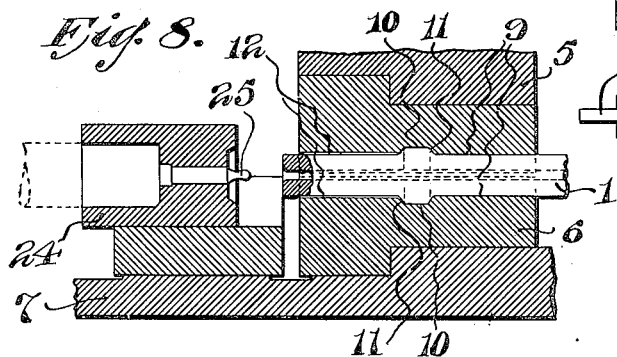
Inventor:
Wade H. Wineman
by
Atty.

Aug. 5, 1924.  1,503,678
W. H. WINEMAN
APPARATUS FOR MAKING DRILL STEELS
Filed Feb. 10, 1917    2 Sheets-Sheet 2
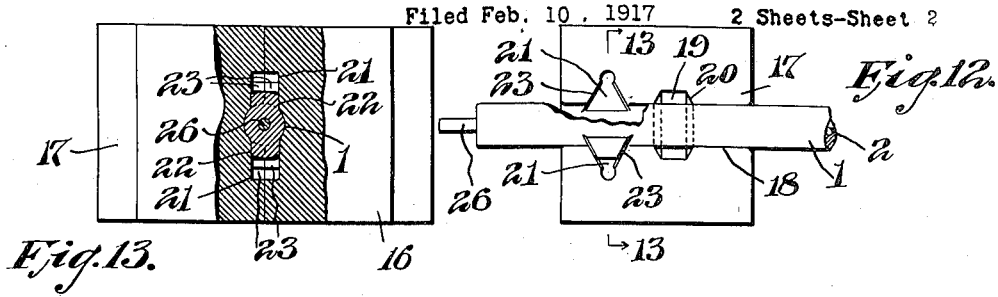
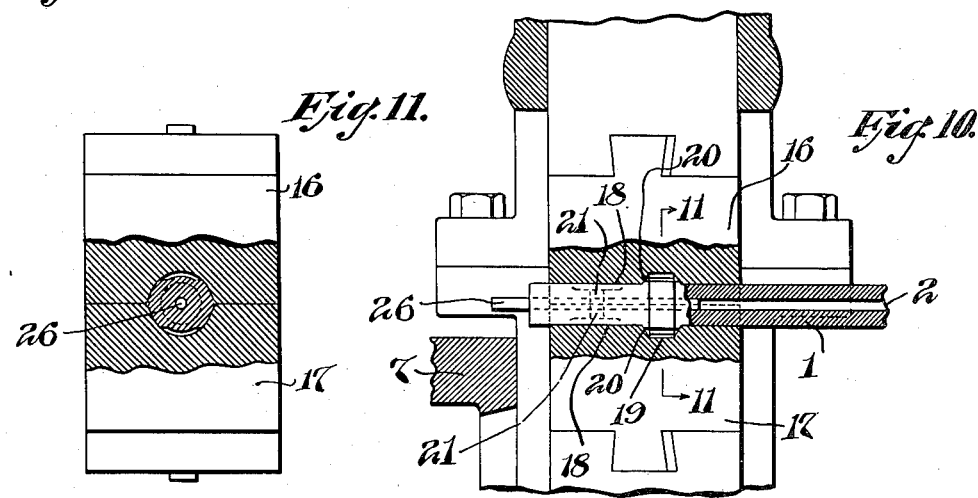
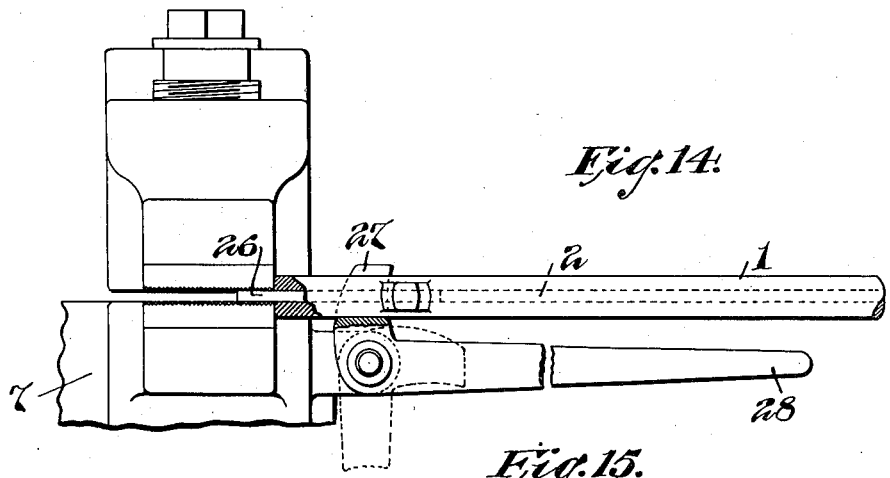
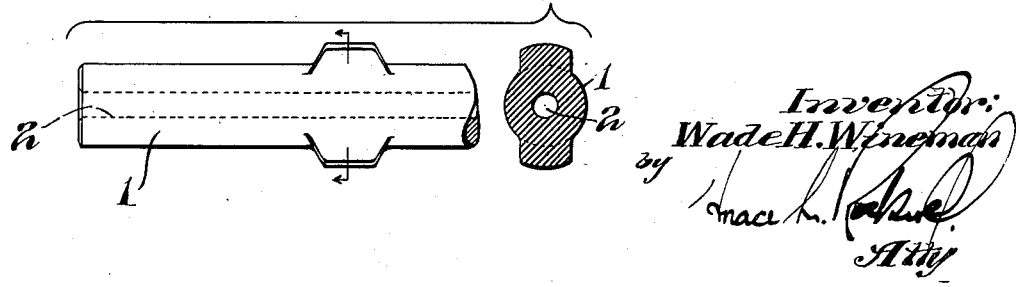
Inventor:
Wade H. Wineman
by
Atty Patented Aug. 5, 1924.

1,503,678

UNITED STATES PATENT OFFICE.

WADE H. WINEMAN, OF CHICAGO, ILLINOIS, ASSIGNOR TO SULLIVAN MACHINERY COMPANY, A CORPORATION OF MASSACHUSETTS.

APPARATUS FOR MAKING DRILL STEELS.

Application filed February 10, 1917. Serial No. 147,809.

*To all whom it may concern:*

Be it known that I, WADE H. WINEMAN, a citizen of the United States, residing at Chicago, in the county of Cook and State of Illinois, have invented certain new and useful Improvements in Apparatus for Making Drill Steels, of which the following is a full, clear, and exact specification.

My invention relates to apparatus for making drill steels.

It has for its object to improve the manufacture of drill steels in such a manner that the time and cost of manufacturing the same is materially reduced, at the same time that the quality of the steel is improved. A more specific object of my invention is to provide an improved apparatus for shanking drill steels whereby the above objects are attained.

In the accompanying drawings, I have illustrated one form of apparatus embodying the invention, the same being shown for purposes of illustration as applied to use in shanking lugged steels and as adapted to use in connection with a forging machine of the general type described and claimed in my copending application Serial No. 84,960, filed Mar. 17, 1916.

In these drawings,—

Fig. 1 is a plan view of a drill steel prior to the shanking process.

Fig. 2 is a somewhat diagrammatic vertical sectional view of the heater with the steel therein.

Fig. 3 is a similar view showing the steel in the quenching bath.

Fig. 4 is a partial vertical sectional view showing the clamping dies and the upsetting dolly.

Fig. 5 is a partial plan view showing the steel in the lower upsetting die at a later stage in the upsetting process, the upper die being removed to facilitate illustration.

Fig. 6 is a sectional view taken on line 6—6 of Fig. 5.

Fig. 7 is a view showing the steel when reheated.

Fig. 8 shows the steel again in the clamping dies and operated on by the hole-opening dolly.

Fig. 9 shows the steel with the pin inserted therein.

Fig. 10 is a partial vertical sectional view showing the swaging dies with the steel in one position therein.

Fig. 11 is a sectional view taken on line 11—11 of Fig. 10.

Fig. 12 is a plan view of the lower swaging die with the steel in another position therein, the upper die being removed to facilitate illustration and with parts broken away.

Fig. 13 is a partial transverse sectional view taken on line 13—13 of Fig. 12 and showing both swaging dies.

Fig. 14 is a side elevation, partially in section, showing the pin being removed from the steel.

Fig. 15 shows a plan and a transverse sectional view of a finished steel shank.

In accordance with my improvement, a drill steel 1, which may be of any suitable cross section and axially perforated at 2 or not, as desired, is first heated in any suitable manner at a point intermediate its ends and preferably adjacent one end of the same where it is desired to form the shank, the steel preferably being heated in a suitable forge or furnace of any desired type, as shown diagrammatically at 3. The end of the steel is next plunged into a suitable quenching bath, as for instance that indicated at 4, preferably until the quenching fluid extends up to the heated portion which it is desired to work. As a result this end of the steel is cooled in such a manner as to prevent the same from subsequently being upset during the upsetting process, while the adjacent heated portion is maintained at high heat.

In the next step in the process in which my improved apparatus is utilized, the steel is clamped as shown in Fig. 4 in suitable clamping dies, as for instance between the upper die 5 and the lower die 6, of similar conformation. As illustrated, one of these dies, as for instance the die 6, may be carried upon a suitable base 7, while the other, as for instance the die 5, may be attached to a suitable movable clamping member 8. These dies, it will be noted, are provided with cooperating longitudinally disposed steel receiving surfaces, preferably in the form of channels 9, at one end of the same, adapted when the member 8 is lowered as shown in Fig. 4, to clamp the steel securely in position, the cross section of the channel formed by the two cooperating channels obviously being substantially the same as the cross section of the steel. At a point intermediate their ends, it will also be noted that each of these dies is provided with a laterally extending recess 10, preferably semi-annular or semi-elliptic in form, having slightly beveled edges as shown at 11. It will also be noted that leading from these recesses 10 and forming a continuation of the channels 9 at the opopsite side of the recesses 10, are similar but slightly larger steel receiving channels 12. In these dies the steel is clamped in the position shown in Fig. 4, i. e. with the heated portion opposite the recesses 10 and the quenched end protruding out of the channels 12.

The next step involves the upsetting of the steel by striking a series of rapidly recurring hammer blows upon the quenched end of the steel which protrudes from the channels 12 in the dies 5 and 6, in such a manner as to force the heated metal between the two cool sections of the steel out laterally to fill the grooves 10, the blow coming against the farther wall thereof. In the form of my invention shown herein, this is accomplished by the action of a removable reciprocating dolly 13, reciprocable by any suitable means relative to the base 7 and having a recessed end 14 disposed coaxially with and adapted to receive the quenched end of the steel, which, as above described, has been hardened in such a manner that it will not be itself upset by the action of the dolly. In a preferred form, while the grooves 10 may cooperate to form a true annulus on the steel as a result of this upsetting step, these grooves when used for forming lugged steel are instead shaped in such a manner that they permit slight enlargements 15 (Fig. 6) to be formed at the sides of the steel, as it is found that by so shaping the dies the metal is more readily and quickly brought into the ultimate shape.

In the next step in the process, the inner end of the steel to a point at the inner side of the collar thus far formed, is preferably reheated. Then, the steel is placed between suitable swaging dies 16 and 17, of which for instance the die 17 may be stationary and carried on the base 7, while the die 16 is vertically reciprocable during the swaging operation. These dies, it will be noted, are provided with cooperating shank truing or swaging channels 18 and a plurality of cooperating apertures, preferably located intermediate the ends of the channels, adapted to act on the collar formed on the steel. One of these apertures, as shown in Figs. 10 and 11, is substantially annular in shape, being formed by cooperating annular grooves or recesses 19 having sloping sides 20; while the other aperture is formed by cooperating oppositely disposed substantially V-shaped recesses 21, illustrated in Figs. 12 and 13, having substantially flat bottoms 22 and sloping sides 23, the latter diverging toward the channels 18. Obviously, the recesses 19 will tend to round, bevel, and shape up the collar-like portion, while the recesses 21 will tend to form the lugs on the shank. In making a steel of the type shown in Fig. 15, the same is alternated between these different apertures, the same preferably being placed in the recesses 21 to further form the extensions 15 into the shape shown in Fig. 13, and then placed in the grooves 19 to round off and bevel the edges of the lugs as shown in Fig. 11. Obviously, in order to finish off such a steel, the same may be, if desired, again placed in the clamping dies as illustrated in Fig. 4, and operated upon by the dolly 13, or alternated between the upsetting process and the swaging dies in such a manner as to complete the lugs, round up the stock, true up the end, and bevel the edges of the steel, as desired.

If it is desired to use my improved apparatus in connection with hollow drill steel, such as that provided with an axial opening 2 therein, after the steel has been collared as shown in Fig. 6 and reheated, the same is again placed in the clamping dies 5 and 6 and operated upon by a dolly 24, which may be substituted for the dolly 13. This dolly in turn carries a pin 25, preferably having a slightly elongated rounded end portion and a conical base, and disposed coaxially with respect to the steel and adapted to enter the axial opening 2 therein, and open the end of the same after a few reciprocations of the dolly. Next, the pin 26 is inserted in the end of the steel, preferably to a point just beyond the collar, as shown in Fig. 9, and this pin is left in the steel during the swaging operation which follows, in order to prevent the closing of the hole by this operation. When, however, the steel has completed the swaging operation, i. e. has been alternated between the recesses 19 and 21, as described above, this pin is removed, as for instance by clamping the same between the die carrying members 7 and 8 and bringing the claws 27 of a pin-removing lever 28 carried on the frame 7, between the lugs then formed on the steel and the die carrying members, and depressing the lever 28, whereupon the steel will be readily withdrawn from the pin. Obviously also, after the pin has been thus removed, the steel may be finished as desired by chamfering the hole slightly by again placing the steel in the clamping dies and reciprocating the pin carrying dolly 24 and also by further swaging if necessary.

In carrying out my improvement, I may if desired utilize a forging machine of the type described and claimed in my copending application heretofore referred to, although the same may obviously be practiced in connection with other apparatus. In this machine, however, it will be noted that the several elements operating upon the steel are arranged in a convenient order, greatly facilitating the operations, the power driven dolly being arranged at the back so that it may operate upon the end of the steel removed from the operator, while the power actuated clamping dies are in front of the dolly and in position to clamp the steel when operated on by the latter, and the power driven swaging dies are in front of the clamping dies so that during the finishing process the operator is enabled to have an unobstructed view of the lugs. In this construction also, it is possible to elevate the swaging die 16 in such a manner that the same is out of the way when the steel is clamped between the clamping dies and being operated on by the upsetting dolly. As described in that application, means are also provided whereby the pin may be readily removed from the steel when shanking hollow drill steel.

In the use of my improvement, it has been found that an operator may readily form shanks of either the round collar or lugged type on either solid or hollow steel, shaping the same into the desired dimensions with great rapidity and accuracy and little or no difficulty. It has also been found that through the use of my improved apparatus, the metal in the shanks of the steels is worked in such a manner that a shank of high quality is produced, and that the difficulty with breakage of the same heretofore experienced is thus largely eliminated. These and other advantages of my improvement will, however, be clearly apparent to those skilled in the art. In my present application I am presenting claims directed to the apparatus disclosed, while in my divisional application, Serial No. 715,517, filed May 24, 1924, I am claiming the method.

While I have in this application specifically described one embodiment which my improved apparatus may assume in practice, it will be understood that various modifications may be made in the same without departing from the spirit of the invention, and that it is my intention to include all such modifications within the scope of the appended claims.

What I claim as new and desire to secure by Letters Patent is:—

1. Steel shanking mechanism comprising die blocks having steel clamping and enlarged steel receiving channels extending in alinement through the same, said channels being joined by an enlarged lug-forming pocket.

2. In combination, a pair of dies each having a longitudinally extending steel clamping channel therein, a similarly arranged steel receiving passage and a laterally extending pocket connecting the ends of said channels, and means for upsetting into said pocket steels clamped between said dies, said dies being operative to clamp a steel within said clamping channel and hold the same against longitudinal movement during the entire period of upsetting thereof.

3. The combination with shanking dies comprising die blocks formed with cooperating steel carrying channels of different diameters, and an enlarged pocket between the adjacent ends of said channels, of upsetting mechanism adapted to operate upon a steel clamped in the channel of smaller diameter and disposed in the channel of larger diameter.

4. In combination, a pair of dies comprising a pair of grooves cooperating to grip a drill steel at a point adjacent its end, a pair of grooves in alinement with and of larger diameter than said first mentioned grooves to freely receive the end of said steel and guide the same during actuation by suitable upsetting means, and a pocket between and joining said grooves to receive the metal upset during the upsetting process.

5. In combination, a pair of clamping dies each having cooperating co-axially disposed steel receiving channels of different diameters and a laterally extending recess intermediate the ends of said channels, and means engageable with the protruding end of a steel clamped between said dies for upsetting the same against one wall of said laterally extending recess.

6. In combination, a pair of clamping dies each having cooperating co-axially disposed steel receiving channels of different diameters and a laterally disposed substantially semi-annular recess disposed intermediate the end of said channels, and means engageable with the protruding end of a steel clamped between said dies for upsetting the same against one wall of said semi-annular recess.

7. Swaging dies for shanking drill steel comprising fixed and movable die blocks, each of said die blocks having a longitudinally extending steel carrying channel and a transversely disposed semi-annular groove and a pair of oppositely disposed triangular shaped notches located on opposite sides of said channel.

8 Swaging dies for shanking drill steel comprising fixed and movable die blocks, each of said die blocks having a steel carrying channel extending longitudinally thereof and a substantially semi-annular transversely disposed recess and a pair of oppositely disposed V-shaped recesses, all of said recesses being disposed between the ends of said channel.

In testimony whereof I affix my signature.

WADE H. WINEMAN.